(12) United States Patent
Nae

(10) Patent No.: US 7,878,593 B2
(45) Date of Patent: Feb. 1, 2011

(54) ANTI BACK DRIVE DEVICE FOR A SEAT RECLINER

(75) Inventor: Dumitru Dan Nae, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/144,132

(22) Filed: Jun. 23, 2008

(65) Prior Publication Data

US 2009/0315380 A1 Dec. 24, 2009

(51) Int. Cl.
*B60N 2/02* (2006.01)
(52) U.S. Cl. ....................................... 297/362
(58) Field of Classification Search ................. 297/362, 297/374; 475/175, 177
See application file for complete search history.

(56) References Cited

U.S. PATENT DOCUMENTS

| | | | |
|---|---|---|---|
| 5,098,359 A | 3/1992 | Chales et al. | |
| 5,138,744 A | 8/1992 | Coggon | |
| 5,150,632 A | 9/1992 | Hein | |
| 5,154,485 A * | 10/1992 | Fleishman | ............... 297/446.1 |
| 5,205,609 A | 4/1993 | Notta et al. | |
| 5,322,346 A | 6/1994 | Notta et al. | |
| 5,383,710 A | 1/1995 | Premji | |
| 5,524,970 A | 6/1996 | Kienke et al. | |
| 5,590,931 A | 1/1997 | Fourrey et al. | |
| 5,590,932 A | 1/1997 | Olivieri | |
| 5,600,876 A | 2/1997 | Notta et al. | |
| 5,622,410 A | 4/1997 | Robinson | |
| 5,718,480 A | 2/1998 | Schuler et al. | |
| 5,749,625 A | 5/1998 | Robinson | |
| 5,788,330 A | 8/1998 | Ryan | |
| 5,871,414 A | 2/1999 | Voss et al. | |
| 6,520,583 B1 | 2/2003 | Bonk | |
| 6,619,743 B1 | 9/2003 | Scholz et al. | |
| 6,619,744 B2 | 9/2003 | Reubeuze | |
| 6,796,612 B2 | 9/2004 | Shephard | |
| 6,869,144 B2 | 3/2005 | Shephard | |
| 7,066,543 B2 | 6/2006 | Yu | |
| 7,086,699 B1 * | 8/2006 | Addison et al. | ............. 297/374 |
| 7,090,299 B2 * | 8/2006 | Lange | ......................... 297/362 |
| 7,150,503 B2 | 12/2006 | Ohba | |
| 7,261,379 B2 | 8/2007 | Volker et al. | |
| 7,285,398 B2 | 10/2007 | Fraser | |
| 7,325,874 B2 | 2/2008 | Zhang | |
| 7,455,361 B2 * | 11/2008 | Stemmer et al. | ............. 297/362 |

(Continued)

*Primary Examiner*—Milton Nelson, Jr.
(74) *Attorney, Agent, or Firm*—Brooks Kushman P.C.

(57) ABSTRACT

An anti back drive device for releasably securing a seat back with respect to a seat cushion. This device includes an upper gear plate affixed to the seat back and defines gear teeth. A lower gear plate is secured to a seat bottom and defines gear teeth that cooperate with the upper plate gear teeth. The upper gear plate is able to rotate about an axis of rotation that is displaced from an axis associated with the lower gear plate. Wedges are mounted in relation to the upper gear plate. A clutch spring is located within the lower gear plate so that an outside surface of the clutch spring may engage the lower gear plate. A wedge spring engages the wedges that biases them to engage the clutch spring. A driver extends between the lower gear plate, the clutch spring, the wedge spring, and the upper gear plate. Upon rotation of the driver, the clutch spring and the one or more wedges are arcuately displaced and lock the seat back in position.

11 Claims, 5 Drawing Sheets

U.S. PATENT DOCUMENTS 7,520,568 B2 4/2009 Hoshihara et al.
2007/0096530 A1 5/2007 Ohba et al.
2007/0200408 A1 8/2007 Ohta et al.

* cited by examiner

ANTI BACK DRIVE DEVICE FOR A SEAT RECLINER

BACKGROUND OF THE INVENTION

1. Field of the Invention

This invention relates to a securing device for a seat back, such as those used on automobile seats.

2. Background Art

Automobile seats usually have a seat cushion and a seat back. To allow the seat back to be positioned at a desired angular orientation relative to the seat cushion, reclining mechanisms are often provided. Those mechanisms permit the seat back to be pivoted as desired by the seat occupant between a relatively upright position, through intermediate positions, to a substantially reclined position that allows the seat occupant to be recumbent.

One of the problems associated with conventional technology is that forces that may be applied to the seat back during dynamic operating conditions may result in the inclination of the seat back changing or creeping to a position that differs from that at which was initially set. Thus, a need has arisen to avoid periodic adjustment.

Among the art considered before filing this patent application is U.S. Pat. Nos. 5,871,414 and 6,619,743. A related case discloses a compact welded power recliner mechanism—U.S. Ser. No. 60/952,890 filed on Jul. 31, 2007—which is incorporated herein by reference.

SUMMARY OF THE INVENTION

The present invention relates to an anti back drive device for releasably securing a seat back with respect to a seat cushion. It includes an upper gear plate that is affixed to the seat back. The upper gear plate defines gear teeth. A lower gear plate is secured to a seat bottom and defines gear teeth that cooperate with the gear teeth of the upper plate. The upper gear plate is able to rotate about an axis of rotation that is displaced from an axis associated with the lower gear plate so that the upper gear plate may rotate eccentrically in relation to the lower gear plate.

At least one wedge is mounted in relation to the upper gear plate. A clutch spring is located within the lower gear plate so that an outside surface of the clutch spring may frictionally engage a central bore of the lower gear plate. A wedge spring engages the at least one wedge that biases the at least one wedge arcuately and outwardly so that at least one wedge may engage an inner surface of the clutch spring.

A driver extends between the lower gear plate, the clutch spring, the wedge spring, and the upper gear plate. Upon rotation of the driver, the clutch spring and the one or more wedges are arcuately displaced so that the displacement of the upper gear plate is less than the displacement of the driver.

DETAILED DESCRIPTION OF THE PREFERRED EMBODIMENT(S)

Figure 1:
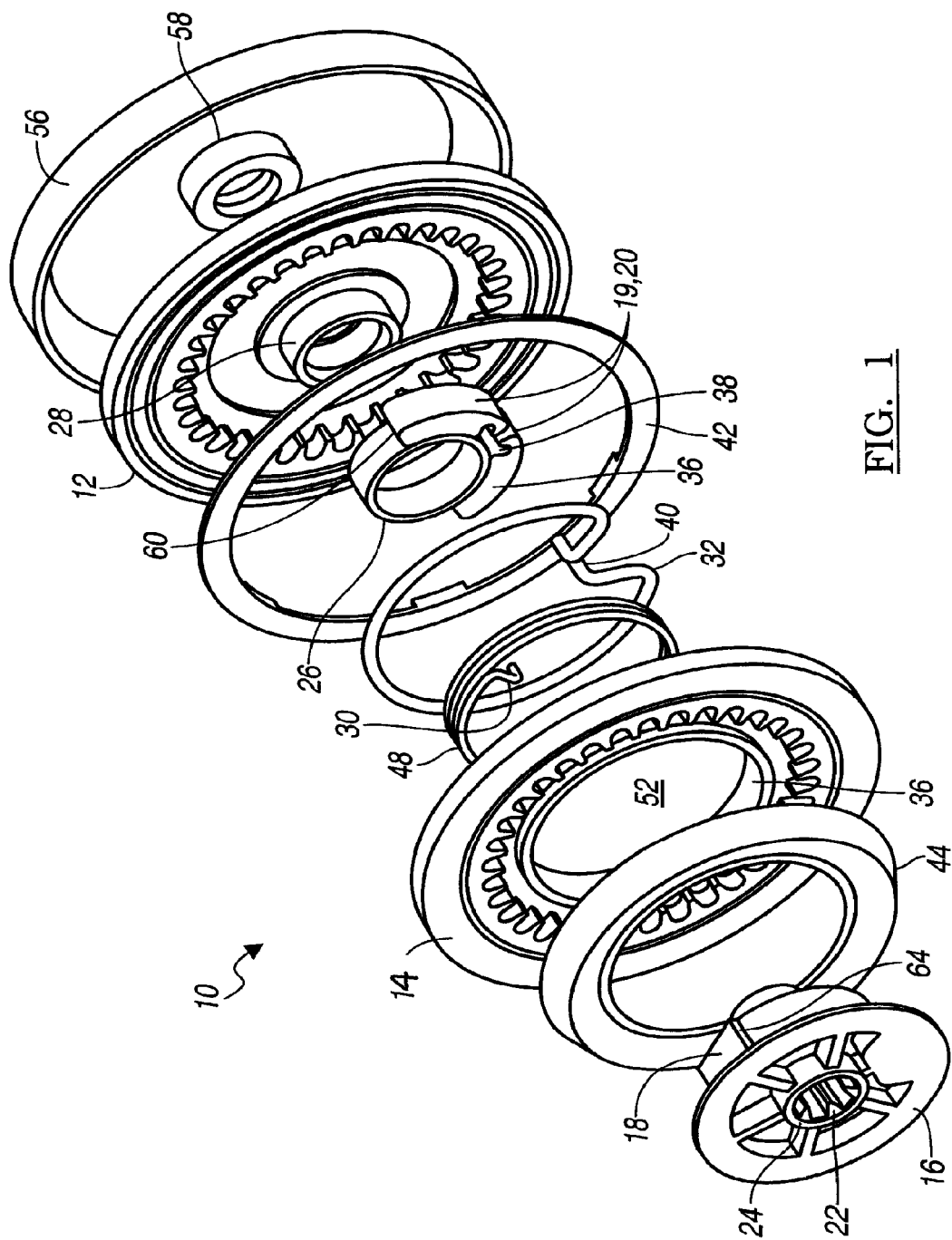
FIG. 1 is an exploded, perspective view of a continuous manual recliner device according to one embodiment of the present invention.
Figure 2:
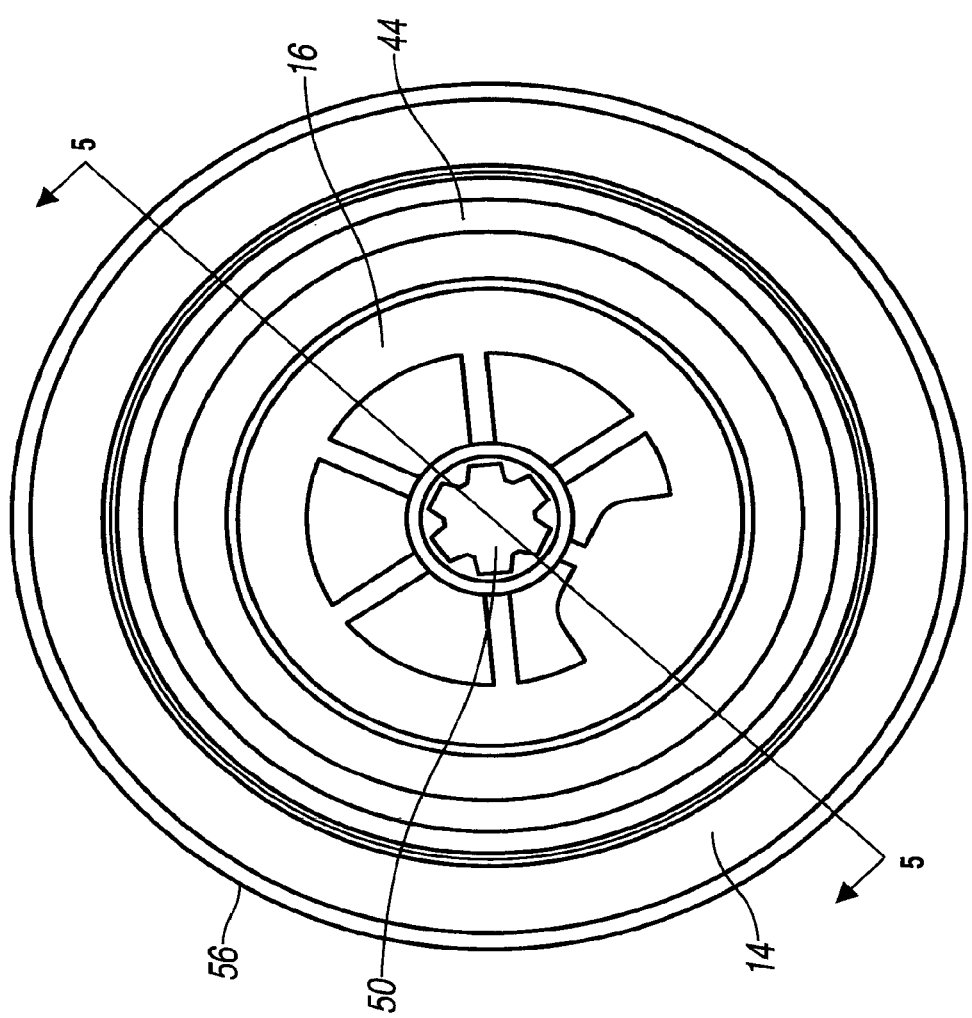
FIG. 2 is an outer left side elevation view of the manual recliner device of FIG. 1.

In FIGS. 1-5, an anti back drive device 10 is illustrated that is part of a continuous manual adjustment mechanism that is incorporated in a seat. The device 10 includes an upper gear plate 12 that cooperates with a lower gear plate plate 14. A driver 16 lies between the gear plate plates 12, 14.

The driver 16 has at least one segment 18 that influences a number (e.g. 2) of wedges 19, 20 in a manner to be described. The driver 16 includes a driveshaft receiving bore 24 that is provided with a plurality of splines 22. A driveshaft (not shown) is received in the driveshaft receiving bore 24.

The following description assumes that the upper gear plate 12 is attached to a moveable seat back (not shown) and that the lower gear plate 14 is attached to a seat bottom or cushion (also not shown), which is fixed if not moved in relation to a track. The back side of the lower gear plate 14 interfaces with the front side of the upper gear plate 12 (FIG. 1).

In one embodiment, a torque bar (not shown) rotates the driver 16 under the influence of turning forces that are exerted by a knob, for example, positioned near or at one end of the torque bar. At the opposite end of the torque bar, a complimentary device 10 is provided on the other side of the seat.

Figure 3:
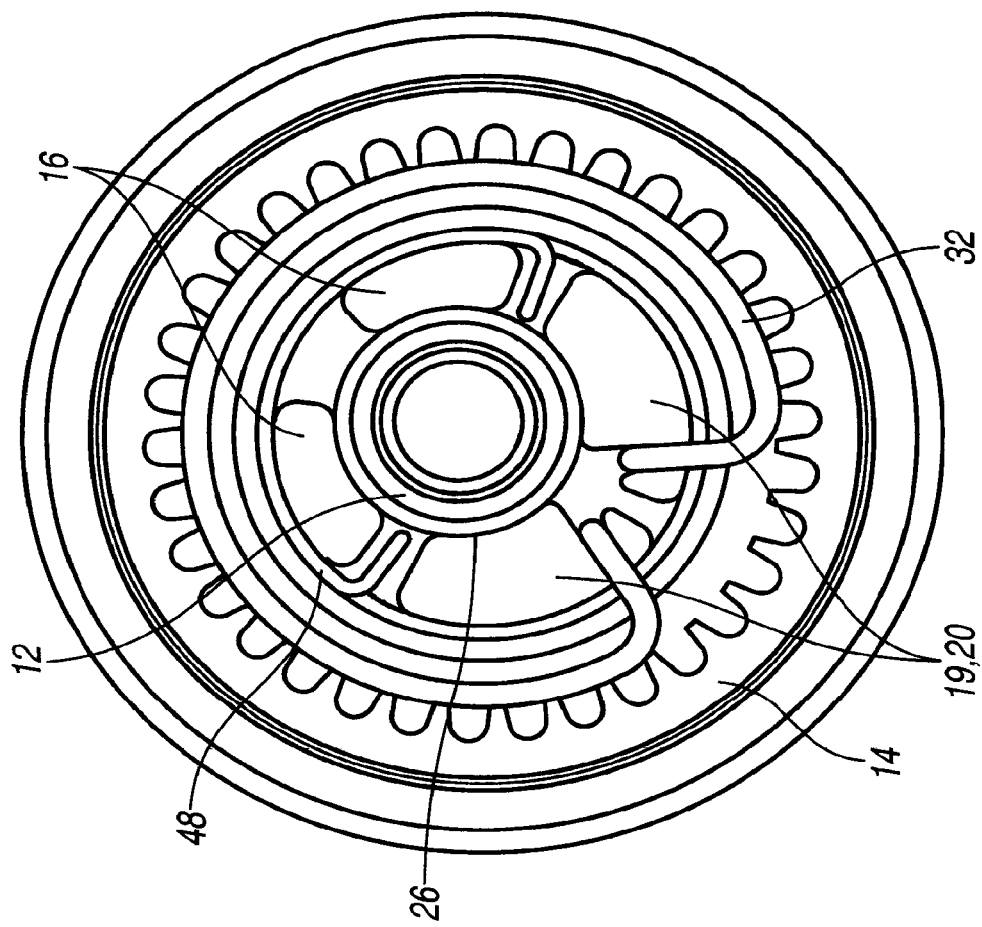
FIG. 3 is an inner side elevation view of the power recliner device of FIG. 1 with a dust cover removed.

The upper gear plate 12 is driven by rotational forces that are manually applied to the driver 16 through a cooperative movement that is described below. The diameter of the spring 48 changes in response. The fixed lower gear plate 14 is eccentrically mounted relative to the moveable upper gear plate 12 (FIG. 3). A ring 26 supports wedges 19, 20. The ring 26 is received by a collar 28 extending from the upper gear 12. In practice, it is sometimes preferred that the ring 26 is press-fitted to the collar 28 that extends from the upper gear plate 12. The ring 26 provides a rigid, smooth bearing surface that cooperates with the wedges 19, 20.

The driver 16 engages a leg 30 of the clutch spring 48 that is mounted inside the lower gear plate 14. Depending upon the direction of driver rotation, the wedges 19, 20 exert gripping forces between the ring 26 and the inside of the clutch spring 48.

In one example, clockwise arcuate movement of the driver 16 by about 34 degrees has the effect, for reasons to be stated later of changing the inclination of the seat back by about 1 degree.

It will be appreciated that in practice, in one embodiment, it may be desirable to engineer a delay between the cause and effect of driver rotation. For example, if the driver 16 is rotated by a few degrees initially, that movement may not be transmitted instantaneously to the clutch spring 48. Neither is that movement instantaneously transmitted from the clutch spring 48 to the wedges 19, 20. One way to achieve the delay is by engineering a gap or space between otherwise cooperating components.

Figure 4:
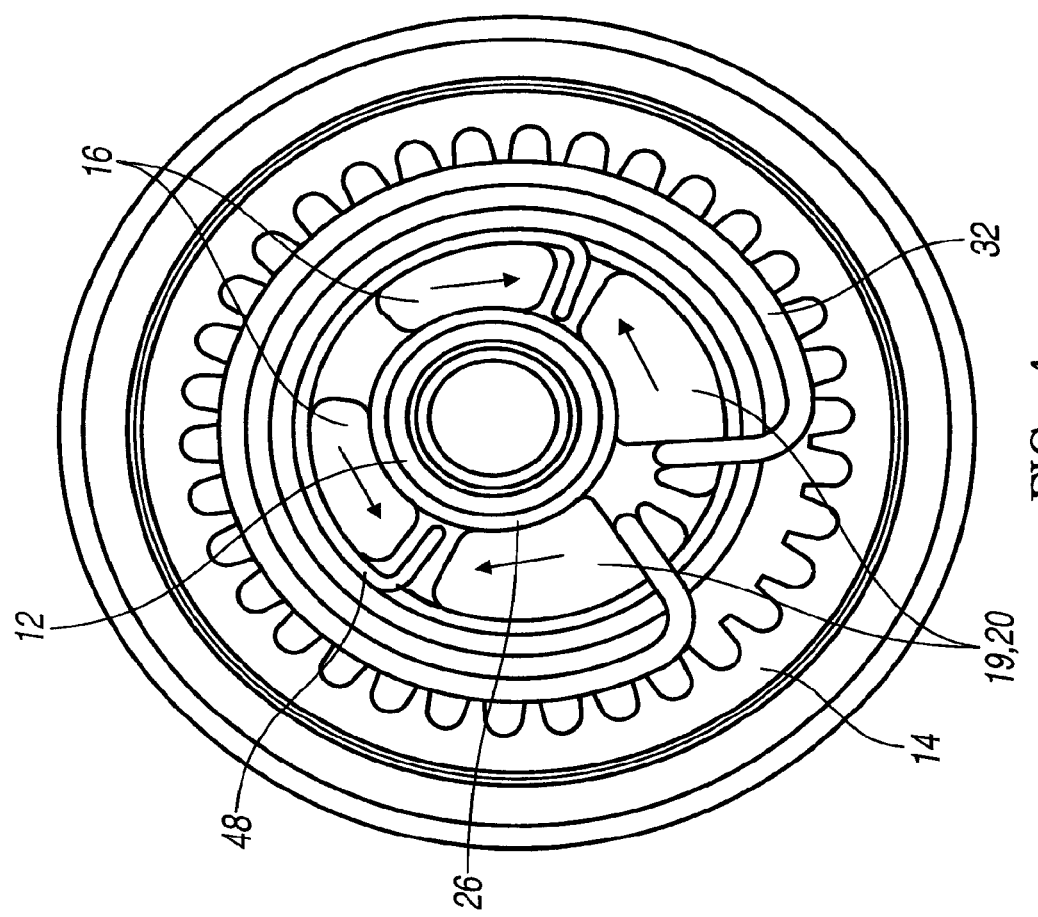
FIG. 4 is an inner side elevation view of the power recliner device of FIG. 3 that illustrates interrelated forces and effects.
Figure 5:
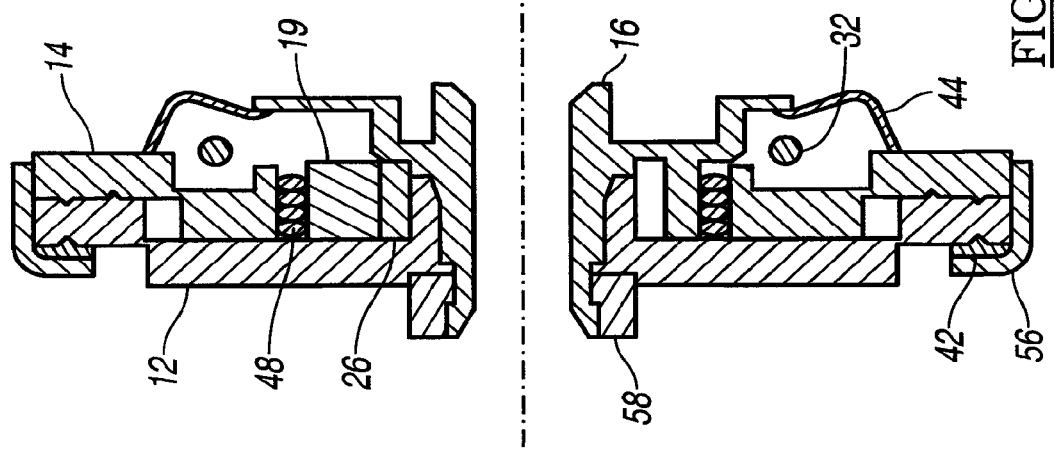
FIG. 5 is a cross sectional view taken along the line V-V of FIG. 2.

A pair of driving legs 30 that are provided on the clutch spring 48 engage the wedges 19, 20 (FIGS. 3, 4). A bearing engaging surface 36 (FIG. 1) of the wedges 19, 20 engages the inside of the clutch spring 48 and thus the bearing surface 36 of the lower gear plate 14. The wedges 19, 20 also include notches 38 that receive first and second axially extending driving legs 30 of the clutch spring 32. Thus the wedge spring 32 biases the wedges 19, 20 so that the ring 26 and the upper gear plate 12 through the collar 28 are secured.

The lower gear plate 14 includes (in the depicted embodiment) a plurality of internal gear plate teeth and a central bore 52 in which the driver 16 is received. External teeth are provided on the upper gear plate 12 that engage the internal teeth of the lower gear plate 14. In a theoretical embodiment, the lower gear plate 14 could be provided with external teeth and the upper gear plate 12 could be provided with internal teeth.

In one embodiment, to adjust the seat back angle, the driver 16 is rotated in a desired direction e.g. clockwise (FIGS. 1, 4). This pushes a leg 30 of the clutch spring 48 which in turn pushes an associated wedge 20. This unlocks the recliner (FIG. 4) and allows the upper gear plate 12 to rotate around the lower gear plate 14. This movement is enabled by the respective gear plate teeth rolling in relation to each other.

Conversely, to prevent undesired tilting when forces are applied to the seat back—which is attached to the upper gear plate 12—the wedge spring 32 urges the wedges 19, 20 away from each other (FIG. 4) and thus lock the clutch spring 48 in relation to the central bore 52 of the lower gear plate 14.

A plurality of tabs are optionally provided that extend axially from one side of the glider 42. The tabs may be received in a plurality of correspondingly located slots that are formed on the disc 56, or vice-versa. A driver clip 58 optionally is received on the end of the driver 16 for holding together the various components in the assembly.

A cup-shaped dust cover 44 partially encloses the lower gear plate 14.

Preferably the driver 16 is formed of a polymer that reduces friction while minimizing noise and vibration in the device 10.

In assembling the disclosed mechanism, the ring 26 (FIG. 1) is mounted on the collar 28 of the upper gear plate 12. Then the lower gear plate 14 is mounted within the inside of the upper gear plate 12. Next, the glider 42 is inserted on the inside of the disc 56.

Then the upper-lower gear plate subassembly is pressed into the inside of the disc 56. Next, the clutch spring 48 is mounted on the inside of the bearing surface 52 that is defined within the lower gear plate 14. Then the wedges 19, 20 are assembled on the outside of the ring 26 and placed within the clutch spring 48.

The next step is to insert the splines 40 that extend from the wedge spring 32 into notches 38 that are defined within the wedges 19, 20. Then the dust cover 44 is applied to the outer surface of the lower gear plate 14.

Finally, the driver 16 is inserted within the dust cover 44. The end of the driver 16 is then received within the upper gear plate 12, and is secured in that position by the driver clip 58 that is placed on the outside of the upper gear plate 12.

It will be appreciated that in practice, there are a number of alternative ways for securing the components of the assembly together. By way of non-limiting examples, TIG welding, MIG welding, or laser welding are illustrative approaches.

In operation, the occupant of the seat may, for example, desire to change the inclination of the seatback from 19 degrees to 20 degrees in relation to a vertical plane. To accomplish this objective, the vehicle seat occupant may manually rotate a knob that is affixed to a torque rod (not shown) that is in turn engaged by the splines 22 that extend from an axial bore 24 within the driver 16. In an illustrative, non-limiting embodiment, consider the effect of the vehicle occupant rotating the knob by about 34 degrees. After that angular displacement, the torque rod rotates the driver 16 (optionally, following a short delay) by about 34 degrees. The driver 16 has a flange 64 which engages the leg 30 of clutch spring 48 and in turn a surface 60 of a wedge 19, 20. The effect of this rotation for example in a clockwise direction when viewed from the perspective of FIG. 1 is to unlock or disengage the assembly, thereby allowing intermeshing teeth to roll in relation to each other.

A list of reference numerals and the components to which they refer now follows:

| Ref. No. | Component |
| --- | --- |
| 10 | Drive device |
| 12 | Upper gear plate |
| 14 | Lower gear plate |
| 16 | Driver |
| 18 | Segment |
| 19, 20 | Wedges |
| 22 | Splines |
| 24 | Driveshaft receiving bore |
| 26 | Ring |
| 28 | Collar |
| 30 | Driving legs |
| 32 | Wedge spring |
| 34 | Engaging surface |
| 36 | Bearing surface |
| 38 | Notches |
| 40 | Spline |
| 42 | Glider |
| 44 | Dust cover |
| 48 | Clutch spring |
| 50 | Axial channel |
| 52 | Bearing Surface |
| 56 | Disc |
| 58 | Driver clip |
| 60 | Surface |
| 64 | Flange |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An anti back drive device for releasably securing a seat back with respect to a seat cushion, comprising:

an upper gear plate adapted to be affixed to the seat back, the upper gear plate defining gear teeth;

a lower gear plate secured to a seat bottom, the lower gear plate defining gear teeth that cooperate with the gear teeth of the upper plate, the upper gear plate being able to rotate about an axis of rotation that is displaced from an axis associated with the lower gear plate;

at least one wedge that is mounted in relation to the upper gear plate;

a clutch spring that is located within the lower gear plate so that an outside surface of the clutch spring may frictionally engage a central bore of the lower gear plate;

the clutch spring having two driving legs projecting radially inwardly and axially, by which the wedges are engaged;

a wedge spring having one turn and support splines projecting almost perpendicularly therefrom, the support splines engaging the at least one wedge and bias the at least one wedge so that the at least one wedge may engage an inner surface of the clutch spring; and a driver extending between the lower gear, the clutch spring, the wedge spring, and the upper gear, the driver engaging a leg of the clutch spring that is mounted inside the lower gear plate so that, depending on the direction of driver rotation, the at least one wedge exerts gripping forces between a ring and the inside of the clutch spring.

2. The device according to claim 1 wherein the lower gear plate includes a plurality of external gear plate teeth and a central bore in which the driver is received, the upper gear plate being provided with internal teeth that engage the external teeth of the lower gear plate so that when the device is unlocked, the upper gear plate may rotate around the lower gear plate by respective gear plate teeth rolling in relation to each other.

3. The device according to claim 1, wherein one or more of the at least one wedge have notches that receive the splines of the wedge spring, the splines biasing the one or more wedges at a broad side face thereof.

4. The device according to claim 3, wherein each wedge has at the broad side face thereof one notch that receives the spline of the wedge spring.

5. The device according to claim 1 wherein the lower gear plate includes a plurality of inner gear plate teeth and a central bore in which the driver is received, the upper gear plate being provided with external teeth that engage the internal teeth of the lower gear plate so that when the device is unlocked, the upper gear plate may rotate around the lower gear plate by respective gear plate teeth rolling in relation to each other.

6. The device according to claim 1, wherein the lower gear plate has a back side and the upper gear plate has a front side, the back side of the lower gear plate interfacing with the front side of the upper gear plate.

7. The device according to claim 1, wherein rotational forces are manually applied to the driver so that the diameter of the clutch spring changes in response.

8. The device according to claim 1, wherein the lower gear plate is fixed in relation to a seat bottom, the lower gear plate having an axis of rotation, the lower gear plate being eccentrically mounted relative to the upper gear plate, which may move with arcuate displacement of the seat back.

9. The device according to claim 1, further including the ring that supports the at least one wedge, the ring being received by a collar that extends from the upper gear plate, so that the ring is fixedly attached to the collar, the ring providing a rigid, smooth bearing surface that cooperates with the at least one wedge.

10. The device according to claim 1 wherein to prevent undesired tilting when forces are applied to the seat back that is attachable to the upper gear plate, the planar wedge spring urges the at least one wedge away from each other and thus locks the clutch spring in relation to a central bore of the lower gear plate.

11. The device according to claim 1, wherein there is a delay between driver rotation and displacement of the clutch spring, and thus to the at least one wedge.

* * * * *